United States Patent
Beck

(10) Patent No.: US 11,712,847 B2
(45) Date of Patent: Aug. 1, 2023

(54) 3D PRINTER

(71) Applicant: Carl Bernhard Beck, Oslo (NO)

(72) Inventor: Carl Bernhard Beck, Oslo (NO)

(*) Notice: Subject to any disclaimer, the term of this patent is extended or adjusted under 35 U.S.C. 154(b) by 0 days.

(21) Appl. No.: 16/094,482

(22) PCT Filed: Apr. 19, 2017

(86) PCT No.: PCT/NO2017/050096
§ 371 (c)(1),
(2) Date: Oct. 18, 2018

(87) PCT Pub. No.: WO2017/183992
PCT Pub. Date: Oct. 26, 2017

(65) Prior Publication Data
US 2019/0118465 A1    Apr. 25, 2019

(30) Foreign Application Priority Data
Apr. 19, 2016 (NO) .................................. 20160647

(51) Int. Cl.
*B29C 64/209* (2017.01)
*B29C 64/20* (2017.01)
(Continued)

(52) U.S. Cl.
CPC .......... *B29C 64/209* (2017.08); *B29C 64/106* (2017.08); *B29C 64/20* (2017.08);
(Continued)

(58) Field of Classification Search
CPC ... B29C 67/0085; B29C 64/209; B29C 48/78; B29C 48/793; B29C 48/80;
(Continued)

(56) References Cited

U.S. PATENT DOCUMENTS 2,408,588 A * 10/1946 Watts .................. B23K 7/06
239/590.5
5,028,227 A    7/1991 Gellert et al.
(Continued)

FOREIGN PATENT DOCUMENTS

CN    203357906 U    12/2013
CN    104760289 A    7/2015
(Continued)

OTHER PUBLICATIONS

Webster, Merriam. "Conductivity." Conductivity—Definition from the Merriam-Webster Online Dictionary, Apr. 25, 2009, web.archive.org/web/20090425010120/www.merriam-webster.com/dictionary/conductivity. (Year: 2009).*

(Continued)

*Primary Examiner* — Joseph S Del Sole
*Assistant Examiner* — Margaret B Hayes
(74) *Attorney, Agent, or Firm* — Kagan Binder, PLLC

(57) ABSTRACT

A 3D printer and method for increasing the speed of 3D printing, wherein said 3D printer comprises a heating block, a nozzle (1) attached to the heating block, and a hole through the heating block and the centre of the nozzle (1). In said hole there is a heat conductive material (7) attached in at least one place on the inner side wall of the hole for transferring heat (5) from the side wall towards the centre of the hole.

17 Claims, 5 Drawing Sheets

(51) Int. Cl.
  *B29C 64/106* (2017.01)
  *B29C 64/321* (2017.01)
  *B29C 64/295* (2017.01)
  *B29C 64/40* (2017.01)

(52) U.S. Cl.
  CPC .......... *B29C 64/295* (2017.08); *B29C 64/321* (2017.08); *B29C 64/40* (2017.08)

(58) Field of Classification Search
  CPC ....... B29C 48/802; B29C 48/83; B29C 48/84; B29C 48/865; B29C 48/872; B29C 48/875; B29C 48/91; B29C 48/918; B29C 48/832; B29C 48/845
  See application file for complete search history.

(56) References Cited

U.S. PATENT DOCUMENTS

| | | | | |
|---|---|---|---|---|
| 5,213,610 | A * | 5/1993 | Yolton | B22D 21/00 75/338 |
| 5,340,433 | A | 8/1994 | Crump | |
| 7,992,419 | B2 * | 8/2011 | Sillekens | B21C 29/04 72/467 |
| 2006/0159799 | A1 | 7/2006 | Trakas | |
| 2010/0327479 | A1 | 12/2010 | Zinniel et al. | |
| 2012/0070523 | A1 * | 3/2012 | Swanson | B29C 48/02 425/96 |
| 2013/0328228 | A1 | 12/2013 | Pettis et al. | |
| 2014/0159284 | A1 | 6/2014 | Leavitt | |
| 2014/0263534 | A1 | 9/2014 | Post et al. | |
| 2015/0183164 | A1 | 7/2015 | Duty | |
| 2016/0046073 | A1 * | 2/2016 | Hadas | B29C 48/301 425/382.2 |
| 2016/0067924 | A1 * | 3/2016 | Yasuda | B33Y 30/00 264/308 |
| 2016/0200024 | A1 * | 7/2016 | Kim | G05B 19/188 425/143 |
| 2017/0021566 | A1 * | 1/2017 | Lund | B29C 64/106 |

FOREIGN PATENT DOCUMENTS

| | | |
|---|---|---|
| EP | 3199321 A1 | 8/2017 |
| KR | 10-1523692 B1 | 6/2015 |
| WO | WO2015/057886 A1 | 4/2015 |
| WO | WO2015/175651 A1 | 11/2015 |
| WO | 2016047732 A1 | 3/2016 |

OTHER PUBLICATIONS

Dpposition Pursuant to A. 100 EPC for European Patent No. 3445568, filed Sep. 1, 2022, (257 pages).

E-Space net English Abstract and machine translation for CN 104760289 A.

E-Space net English Abstract and machine translation for CN 203357906 U.

E-Space net English Abstract and machine translation for KR 10-1523692 B1.

E-Space net English Abstract and machine translation for WO 2016047732 A..

* cited by examiner

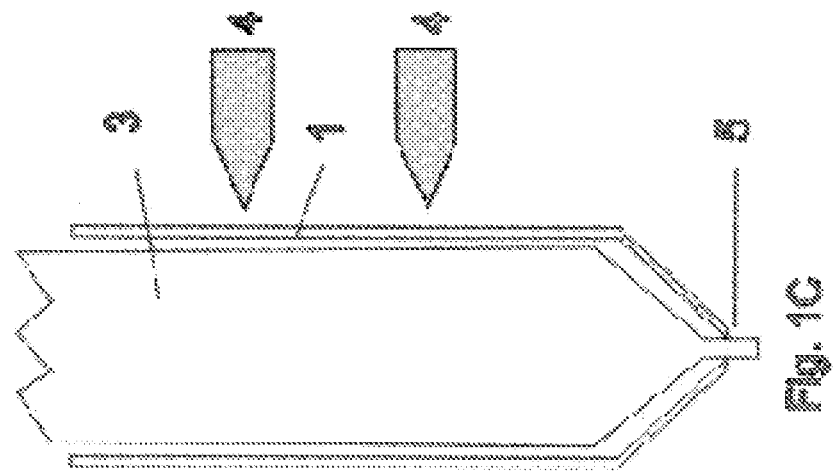
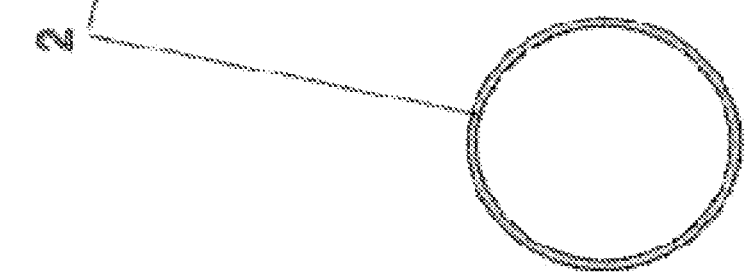

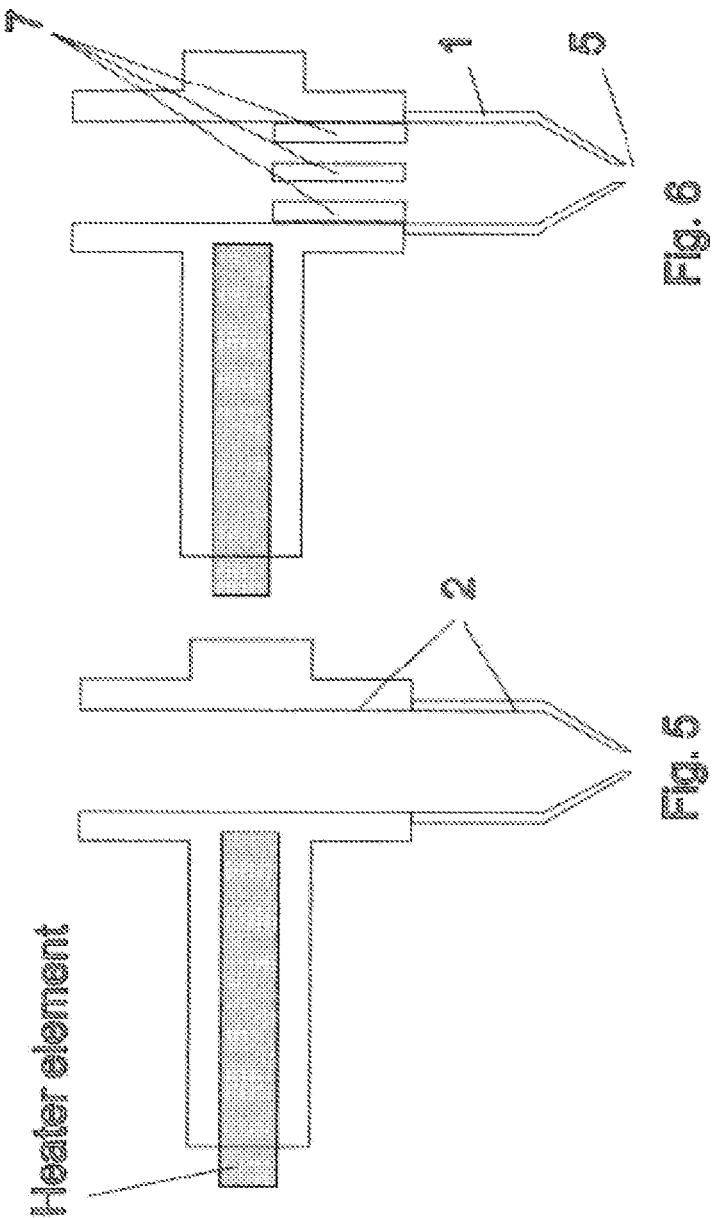

3D PRINTER

TECHNICAL FIELD

The present invention relates to the field of 3D printing, and more particularly a 3D printer and method for heating the plastic component faster which again increases the speed of the 3D printer.

BACKGROUND OF THE INVENTION 3D printers have become very popular during the last few years. Printers used to be large and very expensive, but have now become so small and affordable that they are available for ordinary consumers.

The printers work by melting a plastic component and forcing it out of a hole in a nozzle of the printer. The plastic component then becomes solid after is has exited the nozzle of the printer making it possible to print objects in 3D.

The nozzle is made of metal and is usually in the shape of a hollow cylinder. The nozzle has threads on the outside making it possible to screw into a heating block attached to the printer.

The heating block has electrodes attached which heat it and the nozzle up enough to melt the plastic, turning it into a liquid.

The nozzle and the heating block have a large entry hole allowing the plastic component into the nozzle and the heating block. At the end of the nozzle there is a small exit hole through which the liquid plastic component is forced. This exit hole is ordinarily of a size from 0.25 mm-0.8 mm.

The exit hole is dimensioned in order to give the nozzle and the heating block time to melt the plastic component completely before it exits the nozzle. The speed of printing is therefore a direct result of the ability to melt the plastic component.

The normal way of constructing a nozzle and a heating block results in the plastic component melting from the outside inwards. This results in the core of the plastic component melting last, which takes time.

The speed of the melting of the plastic is therefore a problem that several have tried to solve. One method is to increase the wall thickness of the nozzle in order to make it possible to transfer more heat to the nozzle. Another method is to use a metal that has a higher ability to transfer heat.

None of these solutions is capable of melting the entire plastic component fast enough to make a significant difference in the printing time.

SUMMARY OF THE INVENTION

It is therefore an object of the present invention, as stated in the set of claims, to solve the problems mentioned above.

The invention allows faster printing by reducing the melting time of the plastic component by making it possible to melt the plastic component both from the outside inwards as well as from the inside outwards.

The present invention solves the problem of melting the plastic component from the inside outwards by increasing the surface area of the heating walls. This is done by attaching a heat-conductive piece of material that transfers the heat from the sides of the nozzle and heating block into the centre of the hole.

A preferred heat-conductive material is a piece of metal. This piece of metal is preferably attached to one or more sides of the sides of the nozzle and towards the middle of the hole inside the nozzle. This piece of metal makes it possible to transfer heat into the core of the plastic component.

When the melting time of the plastic component is reduced, the exit hole of the nozzle can be larger in order to make it easier for the melted plastic to exit the nozzle and reduce the time of the 3D printing.

BRIEF DESCRIPTION OF THE DRAWINGS

FIG. 1 A-C is a top view and two side views of known prior art.

FIG. 5 is a cross-sectional view of a prior art solution comprising both the heating block, the nozzle and the heater element.

FIG. 6 is a cross-sectional view of an embodiment of the present invention.

DETAILED DESCRIPTION

Figure 2:
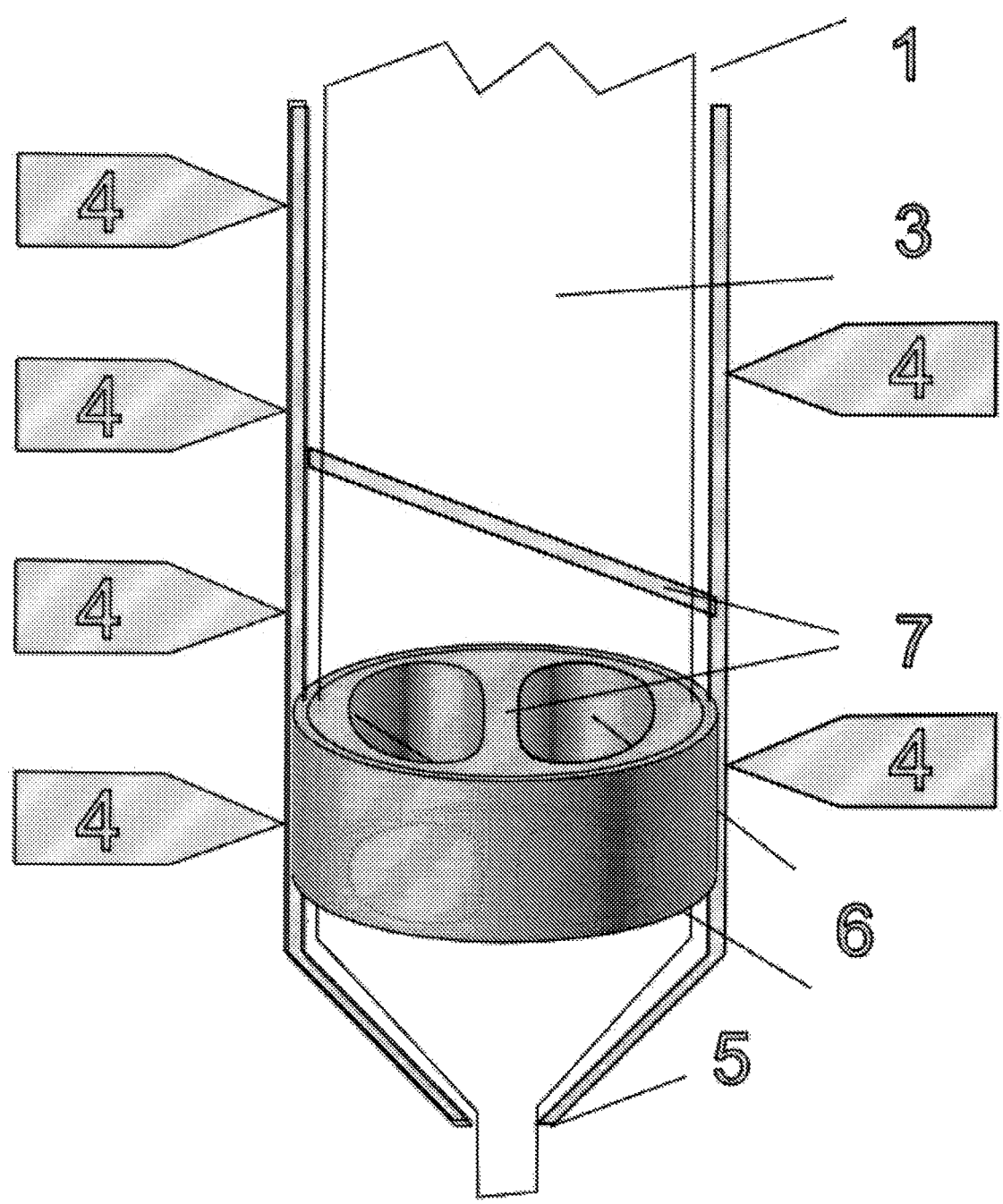
FIG. 2 is a cross-sectional view of an embodiment of the present invention.

FIG. 1 shows the design of a prior art nozzle for a 3D printer. FIG. 1A displays a circular ring. The ring is a top view of a circular tube 2 of metal. The circular tube 2 of metal is an illustration of the passageway through a heating block and the nozzle 1.

FIG. 1B is a side view of the prior art solution shown in FIG. 1A. In this illustration the plastic component 3 passes through the circular tube 2 of metal.

FIG. 1C is a side view of the end of the nozzle 1. Here it is shown that the plastic component 3 is molten and forced out through the exit hole 5 in the nozzle 1. The heat 4 is transferred from the side walls of the tube 2 to the plastic component 3 melting it from the outside inwards.

FIG. 2 is a cross-sectional view of the end part of the nozzle 1 according to an embodiment of the present invention. The nozzle 1 is a circular tube of metal. The circular tube ends up in a conical funnel shape. At the end of the conical funnel shape is an exit hole 5.

The plastic component 3 passes through the nozzle 1. Inside the hollow centre of the nozzle 1 is placed a piece of heat-conductive material 7. The piece of heat-conductive material 7 is preferably a piece of metal. The piece of metal is attached to the side wall in at least one point. The piece of metal extends from the side wall into the centre of the nozzle 1.

The piece of metal can be a metal bar. The metal bar spans the width of the nozzle. The metal bar passes diagonally through the centre of the nozzle. The metal bar transports heat from the side walls to the centre of the nozzle 1. The metal bar can be placed in the heating block.

An alternative solution is to place a block into the centre of the nozzle 1. The block has holes 6 drilled through it. These holes 6 are placed around a central hub in the block. The outer wall of the block touches the inner wall through the nozzle 1 or the heating block. Heat 4 is transferred from the side wall of the nozzle 1 or the heating block to the block. The block then transfers the heat 4 to the central hub of the block.

Figure 3A:
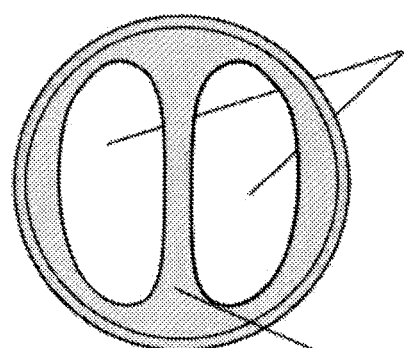
FIG. 3 A-D are top views of different solutions of the present invention.

FIG. 3A is top view of an embodiment of the present invention. In this solution there are two oval-shaped holes 6 in the block. The block can be placed in either the nozzle 1 or the heating block. The two oval holes 6 ensure that there is a piece of metal transferring heat 4 into the centre of either the nozzle or the heating block.

Figure 3B:
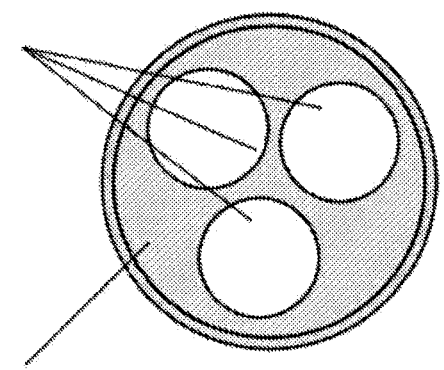

FIG. 3B is a top view of an alternative solution. In this solution there are three parallel holes 6 spaced equally apart around a central hub of the block.

Figure 3C:
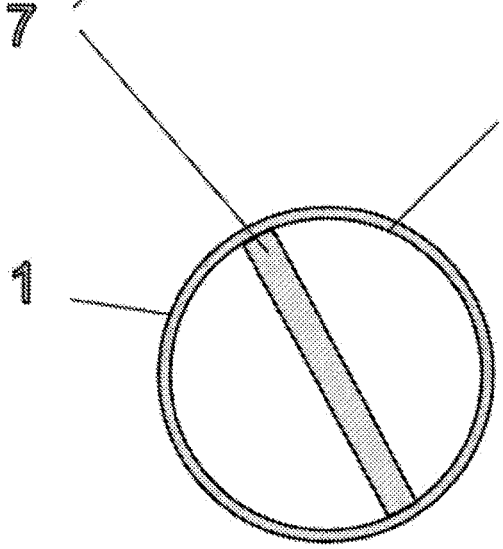

FIG. 3C is a metal bar placed diagonally through the centre of either the heating block or the nozzle 1.

Figure 3D:
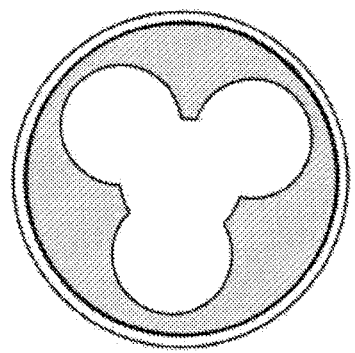

FIG. 3D has no central hub. Here there are metal parts protruding inwards into the centre of either the nozzle 1 or the heating block.

The different solutions for transferring heat 4 from the side walls to the centre of the nozzle 1 or the heating block can be combined to give better effect.

Figure 4:
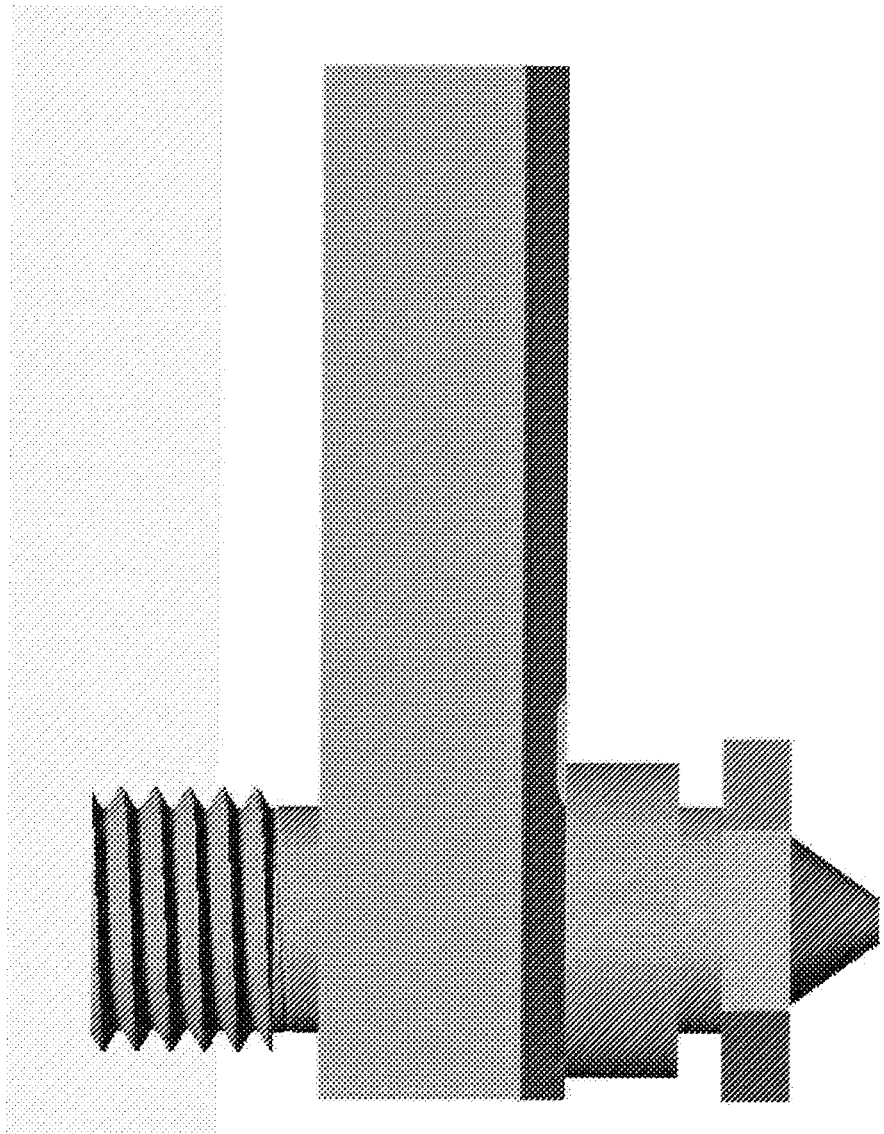
FIG. 4 is a cross-sectional view of the nozzle mounted into the heating block.

FIG. 4 is a cross-sectional view of the nozzle 1 mounted into the heating block. The heating block is heated by electricity. The nozzle 1 is screwed into the heating block. The heating block transfers heat 4 to the nozzle 1.

FIG. 5 is a cross-sectional view of a prior art solution. Here it is displayed a nozzle screwed into a heating block. The heating block is heated by a heater element.

FIG. 6 is a cross-sectional view of an embodiment of the present invention. The nozzle 1 with an exit hole 5 in one end is screwed into the heating block. The heating block has a heater element. Inside the hole in the heating block there is a block of heat-conductive material 7.

The heat-conductive material 7 that transfers heat 4 from the side walls to the centre of the hole can be placed either in the hole going through the heating block or the hole going through the nozzle 1. Alternatively the heat-conductive material 7 can be placed in both the nozzle 1 and the heating block.

In an alternative embodiment two or more holes can be drilled into the nozzle 1 or the heating block instead of one big hole.

The invention claimed is:

1. A nozzle for a 3D printer, the nozzle comprising
a hole extending longitudinally through the nozzle, for through-passing of a plastic component, the hole having an entry hole for receiving the plastic component as a solid and an exit hole through which the plastic component is forced as a liquid, an inner side wall between the entry hole and the exit hole, and a hole cross-section between the entry hole and the exit hole, wherein the exit hole is smaller than the entry hole;
wherein the nozzle comprises a piece of a heat-conductive material located in the hole,
a first end of the piece of the heat-conductive material being attached to a first place to the inner side wall of the hole and extending from the inner side wall into the hole of the nozzle for transferring heat from the inner side wall towards the center of the hole and
a second end of the piece of the heat-conductive material being attached to a second place of the inner side wall between the entry hole and the exit hole, so as to divide the hole cross-section into at least two heating portions;
wherein the nozzle is configured to be attachable into a heating block of a 3D printer, and
the heat-conductive material is configured in the nozzle such that when the nozzle is attached into the heating block, the heat-conductive material is positioned directly laterally from the heating block to transfer heat from the heating block to the heat-conductive material and into the middle of the plastic component to melt the middle of the plastic component when the plastic component passes through the hole.

2. The nozzle according to claim 1, wherein the heat-conductive material is a metal bar placed diagonally through the center of the hole.

3. The nozzle according to claim 1, wherein the heat-conductive material is a heat-conductive block placed in the hole.

4. The nozzle according to claim 3, wherein the heat-conductive block has at least one hole drilled therethrough.

5. The nozzle according to claim 4, wherein the at least one hole comprises a multitude of holes being placed around a central hub in the heat-conductive block.

6. The nozzle according to claim 1, wherein the hole includes an upper section comprising a centralized hole and a lower section with two or more holes drilled into it.

7. The nozzle according to claim 1, wherein the heat-conductive material is a metal.

8. The nozzle according to claim 1, wherein the nozzle is made of metal.

9. A 3D printer comprising:
a heating block into which a nozzle is attached,
a hole passing through the heating block and a center of the nozzle extending longitudinally through the nozzle and having a hole cross-section for through-passing of a plastic component, the hole having an entry hole for receiving the plastic component as a solid and an exit hole through which the plastic component is forced as a liquid, an inner side wall between the entry hole and the exit hole, and a hole cross-section between the entry hole and the exit hole, wherein the exit hole is smaller than the entry hole;
wherein a piece of a heat-conductive material is located in the hole,
a first end of the piece of the heat-conductive material being attached to a first place to the inner side wall of the hole and extending from the inner side wall towards the center of the hole and
a second end of the piece of the heat-conductive material being attached to a second place of the inner side wall between the large entry hole and the exit hole, so as to divide the hole cross-section into at least two heating portions;
wherein the heat-conductive material is configured in the nozzle directly laterally from the heating block to transfer heat from the heating block to the heat-conductive material and into the middle of the plastic component to melt the middle of the plastic component when the plastic component passes through the hole.

10. A 3D printer according to claim 9, wherein the heat-conductive material is metal.

11. A 3D printer according to claim 9, wherein the heat-conductive material is a metal bar placed diagonally through the center of the hole.

12. A 3D printer according to claim 9, wherein the heat-conductive material is a heat-conductive block placed into the center of the hole.

13. A 3D printer according to claim 12, wherein the heat-conductive block has at least one hole drilled there through.

14. A 3D printer according to claim 13, wherein the heat-conductive block includes a multitude of holes placed around a central hub in the block.

15. A 3D printer according to claim 9, wherein the hole includes an upper section comprising a large centralized hole and a lower section with two or more holes drilled into it.

16. A 3D printer according to claim 9, wherein the piece of heat-conductive material is located in the hole above a conical funnel shaped end of the nozzle, and wherein an exit hole for the plastic compound is provided at an end of the conical funnel shaped end of the nozzle.

17. A method for printing with a 3D printer, the 3D printer comprising a heating block, a nozzle attached into the heating block, and a hole that passes through the heating block and a center of the nozzle extending longitudinally through the nozzle and having a hole cross-section for through-passing of a plastic component, the hole having an entry hole for receiving the plastic component as a solid and an exit hole through which the plastic component is forced as a liquid, an inner side wall between the entry hole and the exit hole, and a hole cross-section between the entry hole and the exit hole, wherein the exit hole is smaller than the entry hole;

wherein a piece of a heat-conductive material is located in the hole, a first end of the piece of the heat-conductive material being attached to a first place to the inner side wall of the hole and extending from the inner side wall towards the center of the hole and a second end of the piece of the heat-conductive material being attached to a second place of the inner side wall between the entry hole and the exit hole, so as to divide the hole cross-section into at least two heating portions;

wherein the heat-conductive material is configured in the nozzle directly laterally from the heating block to transfer heat from the heating block to the heat-conductive material and into the middle of the plastic component to melt the middle of the plastic component when the plastic component passes through the hole;

wherein the method includes the steps of:

guiding a plastic material through the hole, heating the plastic material from the outside inwards by the inner sidewall of the hole, and heating the plastic material from the inside outwards by the piece of heat-conductive material.

\* \* \* \* \*